United States Patent
Bowlin

(10) Patent No.: US 6,510,938 B1
(45) Date of Patent: Jan. 28, 2003

(54) SOFT TOUCH INFEED

(75) Inventor: Geoffrey R. Bowlin, Oak Ridge, NC (US)

(73) Assignee: Delaware Capital Formation, Inc., Wilmington, DE (US)

(*) Notice: Subject to any disclaimer, the term of this patent is extended or adjusted under 35 U.S.C. 154(b) by 0 days.

(21) Appl. No.: 09/723,205

(22) Filed: Nov. 28, 2000

(51) Int. Cl.⁷ .................. B65G 29/00; B65G 47/12; B65G 47/26; B65G 47/68; B65G 47/84
(52) U.S. Cl. .................. 198/450; 198/449; 193/2 R
(58) Field of Search .................. 098/449, 450, 098/478.1; 193/2 R

(56) References Cited

U.S. PATENT DOCUMENTS

| | | |
|---|---|---|
| 1,301,348 A | 4/1919 | Wilson et al. |
| 1,713,068 A | 5/1929 | Bach |
| 2,026,811 A | 1/1936 | Bach .................. 198/22 |
| 2,269,422 A | 1/1942 | Ayars |
| 2,388,804 A | 11/1945 | Schurch |
| 2,467,679 A | 4/1949 | Lyon .................. 198/34 |
| 2,868,243 A | 1/1959 | Henschen et al. .......... 141/168 |
| 2,886,157 A | 5/1959 | Hall |
| 3,231,061 A | 1/1966 | Borkmann |
| 3,664,171 A | 5/1972 | Paramonoff .................. 72/344 |
| 3,704,619 A | 12/1972 | Paramonoff .................. 72/349 |
| 3,715,905 A | 2/1973 | Paramonoff .................. 72/349 |
| 3,735,628 A | 5/1973 | Hutchison .................. 72/344 |
| 3,735,629 A | 5/1973 | Paramonoff .................. 72/349 |
| 3,771,345 A | 11/1973 | Paramonoff .................. 72/349 |
| 3,825,270 A | 7/1974 | Paramonoff et al. .......... 277/15 |
| 3,871,233 A | 3/1975 | Paramonoff et al. .......... 73/389 |
| 3,886,781 A | 6/1975 | Paramonoff et al. .......... 72/384 |
| RE28,872 E | 6/1976 | Larkin et al. .................. 113/7 R |
| 3,972,299 A | 8/1976 | Hasselbeck et al. ........ 113/7 R |
| 3,994,251 A | 11/1976 | Hake et al. .................. 113/7 R |
| 4,158,405 A | 6/1979 | Jackson .................. 198/480 |
| 4,246,300 A | 1/1981 | Jensen .................. 427/233 |
| 4,246,770 A | 1/1981 | Franek et al. .................. 72/92 |
| 4,274,533 A | * 6/1981 | Abe .................. 198/450 X |
| 4,467,908 A | 8/1984 | Schneider |
| 4,534,460 A | * 8/1985 | Graham et al. .......... 198/482 X |
| 4,596,107 A | 6/1986 | Pfleger, Sr. .................. 53/53 |
| 4,625,775 A | 12/1986 | Schaltegger .................. 141/83 |
| 4,632,257 A | * 12/1986 | Negishi et al. .......... 193/2 R X |
| 4,664,159 A | 5/1987 | Dugan .................. 141/1 |
| 4,693,055 A | 9/1987 | Olsen, Jr. et al. .......... 53/443 |
| 4,721,200 A | 1/1988 | Dugan .................. 198/480.1 |
| 4,753,275 A | 6/1988 | Schaltegger .................. 141/1 |
| 4,823,983 A | * 4/1989 | Groover et al. .......... 221/92 X |
| 4,914,990 A | 4/1990 | Hellweg et al. .............. 82/54 |
| 4,928,511 A | 5/1990 | Sirvet .................. 72/361 |
| 5,146,818 A | 9/1992 | Hellweg .................. 82/58 |
| 5,231,926 A | 8/1993 | Williams et al. .............. 101/40 |
| 5,341,620 A | 8/1994 | Katou et al. .................. 53/287 |
| 5,460,495 A | 10/1995 | Matsui et al. .............. 418/201.3 |
| 5,501,552 A | * 3/1996 | Simkowski .................. 198/450 X |
| 5,613,593 A | 3/1997 | Gerber .................. 198/479.1 |
| 5,697,274 A | 12/1997 | Maidment .................. 83/114 |
| 5,749,631 A | 5/1998 | Williams .................. 198/441 |
| 5,772,001 A | 6/1998 | Otruba et al. .............. 198/459.2 |

* cited by examiner

Primary Examiner—Joseph E. Valenza
Assistant Examiner—Gene O. Crawford
(74) Attorney, Agent, or Firm—Foley & Lardner

(57) ABSTRACT

The present invention provides a feed mechanism for feeding containers. The feed mechanism includes an infeed starwheel and a main turret starwheel, wherein the pitch line of the infeed starwheel and the pitch line of the main turret starwheel are non-interfacing. The present invention also provides a feed mechanism for feeding containers which includes an infeed starwheel, a main turret starwheel and a feed chute with at least one hump for dissipating the head pressure of the incoming can stack. The present invention also provides a method of feeding cans to a unit operation in a can making process. The method includes the steps of providing a feed chute adapted for gravity feeding the unit operation, the feed chute having a top end and a bottom end, wherein the feed chute has at least one hump proximal to the bottom end and disposing a plurality of cans in the feed chute, thereby forming a stack of cans in the feed chute.

14 Claims, 4 Drawing Sheets

Prior Art

SOFT TOUCH INFEED

BACKGROUND OF THE INVENTION

1. Field of Invention

The present invention generally relates to container manufacturing machines and, in particular, to feed mechanisms for container manufacturing machines.

2. Description of the Related Art

Containers are processed within machines that may perform one or several processes. Attempts by many in the industry have been made to make containers in one machine by combining multiple processes within a single entity defined by discrete separation and transport mechanisms. Differing process requirements, cycle times or progressive geometry changes in the article have prevented this from being achieved.

Containers have to be transported from one process machine to the next and then, in many cases, presented to the processing element of the machine as a discrete unit. In the manufacturing of two piece cans, for example, it is usual to flow containers to the machine in a single file at speeds of up to 2800 per minute. For a typical beer or beverage can having a diameter of 2.60 inches, this translates to a conveying speed of 10 feet per second.

During transport from process machine to process machine, the cans are typically in contact with each other. However, for processing in the machines, the cans have to be separated and moved further apart. This is because the mechanical process components need space to operate on individual cans. Machine designers strive to minimize this space, or pitch, but it is typically in excess of 6.0 inches and may be as large as 8.75 for some machines.

Cans arriving at a process machine without sufficient pitch, may be dented during separation. Dents are bad because they weaken the can. In order to maintain adequate strength for further processing, excess metal has to be used to compensate for the denting. As 65% of the cost of the can is the metal, minimizing dents is important. Separating the cans so that they can be processed in a controlled manner and with no damage has become increasingly difficult as cans have become thinner and speeds increased. Within the infeed of a machine, cans are accelerated to between 150% and 350% of their delivery speed in a few milliseconds.

Typical early process machinery for feeding cans used either an indexing process or continuous rotary motions. For an indexing machine, one could use a tick-tock gate or the turret periphery to meter product into the machine feed turret or main process turret from a gravity feed track. Additionally, a tick-tock gate or the turret periphery could be used to meter rope, belt, chain, magnetic, air or vacuum feed conveyors.

A conventional gravity feed mechanism for a trimmer is illustrated in FIG. 1. The Trimmer 1 has two gravity fed infeed chutes 3. Each infeed chute 3 delivers cans directly to a process turret 5. The cans are trimmed and then exit on conveyor 7.

Indexing limited throughput to about 350 cans per minute (cpm) and caused a low feed velocity. Continuous rotary motion enabled progressively faster speeds but conventional wisdom held speeds below 100 cpm per working pocket. For a machine to be rated at 800 cpm it needed at least 8 working pockets.

A preferred separation and timing device used in the prior art was the Feed Screw, illustrated in FIG. 2. This was a typically 3" diameter screw 21 with a progressive helix matching the outside diameter of the can. The initial lead pitch was the same as the can diameter and the final pitch matched the tangent velocity of the pitch line of the feed turret 23 of the machine. The can was fed from the screw 21 into a pocket 22 of feed turret 23. The tip 24 of the pocket 22 cupped the can as the can moved toward the main turret 25. The can was passed to the main turret 25, trimmed and exited through the discharge chute 27. The energy to accelerate and separate the cans comes from gravity or a driving conveyor running under the base of the cans at least as fast as the pitch-line velocity of the turret. The screw is used to hold back and meter the cans in a controlled way.

The Feed Screw was also considered a random feed device. A second process machine was operated continuously at a constant speed that was faster than the machine before it. This resulted in gaps in the product flow. The first can of the next "stick" (column of cans) was fed at random into the in-running nip of the screw 21 where it sometimes bounced around, getting dented, until there was enough pressure from behind to force it in. Other feed techniques used included mechanically complex advancing starwheel pockets or sweeper arms to meter cans to the starwheel.

Coors introduced a Constant Velocity starwheel on their 1975 LAG 75 Necker/Flangere®, designed for 1200 cpm (FIG. 6). The 12 pocket turret 63 had a 13.5" pitch can diameter (where the pitch can radius 68 is measured from the center of the turret to the center of the can and the locus of pitch can diameters defines a pitch circle 64), so pocket separation was only 3.5". Cans 62 coming in were metered and separated by a combination of a curved infeed track 61 and a cam form 69 on the trailing side of the hooked starwheel pocket 65. The geometry maintained a constant speed of flow in the can stack during the stripping of each can 62, hence the name. In the LAG 75® machines, there were no infeed mechanisms at all. Cans 62 fed directly into the main process turret 63. A gravity chute 61 linked the process turrets 63 with a timed can stop maintaining the stack height.

If the combination of a curved infeed track 61 and a cam form 69 on the trailing side of the hooked starwheel pocket 65 is used in a direct turret to turret transfer within a machine, the profile of the pockets has to be truncated at the pitch line 64. This is necessary in order to prevent the tip "hooking" through the can as it is transported away by the subsequent turret. This is illustrated in FIG. 6 at numeral 66. Additionally, the hook 65 supports the stack early and does not reverse the flow of the cans 62 (illustrated at numeral 67).

The final evolution of this system was the 595 Super K® (FIG. 7). It uses a slightly modified path geometry for 3000 cpm capability feed into a vacuum infeed turret 73 with 12 pockets and 13.5" pitch can diameter (pitch circle 74). The main turret 75 also has a 13.5" pitch can diameter (pitch circle 76). Thus, the pitch circles 74, 76 are interfacing. The infeed turret 73 has truncated hooked pockets 77 which facilitate transfer of cans from interfacing turrets (illustrated at numeral 79).

Belvac used a modified constant velocity (CV) path geometry in trimmers which, by necessity, run at sub-500 cpm speeds. The constant velocity infeed starwheel was introduced in 1985 to eliminate a complex tic-toc metering and stop mechanism.

A CC93® constant velocity infeed is illustrated in FIG. 3. Cans were gravity fed in the infeed chute 31. A pneumatic stop 32 was used to interrupt the flow of the cans into the infeed starwheel 33 as the head was depleted. Cans were then passed from the infeed starwheel 33 to the main turret 36 via the infeed gate 35. The CC93® infeed also included a timing mechanism 34 to aid in controlling the pneumatic stop. After trinnig, the cans entered an outfeed chute 37. Scrap material exited through scrap duct 38.

SUMMARY OF THE INVENTION

The present invention provides a feed mechanism for feeding containers including: an infeed starwheel and a main turret starwheel, wherein the pitch line of the infeed starwheel and the pitch line of the main turret starwheel are non-interfacing.

The present invention also provides a feed mechanism for feeding containers including: an infeed starwheel, a main turret starwheel and a feed chute with at least one hump for dissipating the head pressure of the incoming can stack.

The present invention also provides a method of feeding cans to a unit operation in a can making process including: providing a feed chute adapted for gravity feeding said unit operation, the feed chute having a top end and a bottom end, wherein the feed chute has a hump proximal to the bottom end and disposing a plurality of cans in the feed chute, thereby forming a stack of cans in the feed chute.

BRIEF DESCRIPTION OF THE DRAWINGS

The foregoing and other features, aspects and advantages of the present invention will become apparent from the following description, appended claims and the exemplary embodiments shown in the drawings, which are briefly described below.

DETAILED DESCRIPTION OF THE PREFERRED EMBODIMENTS

Figure 1:
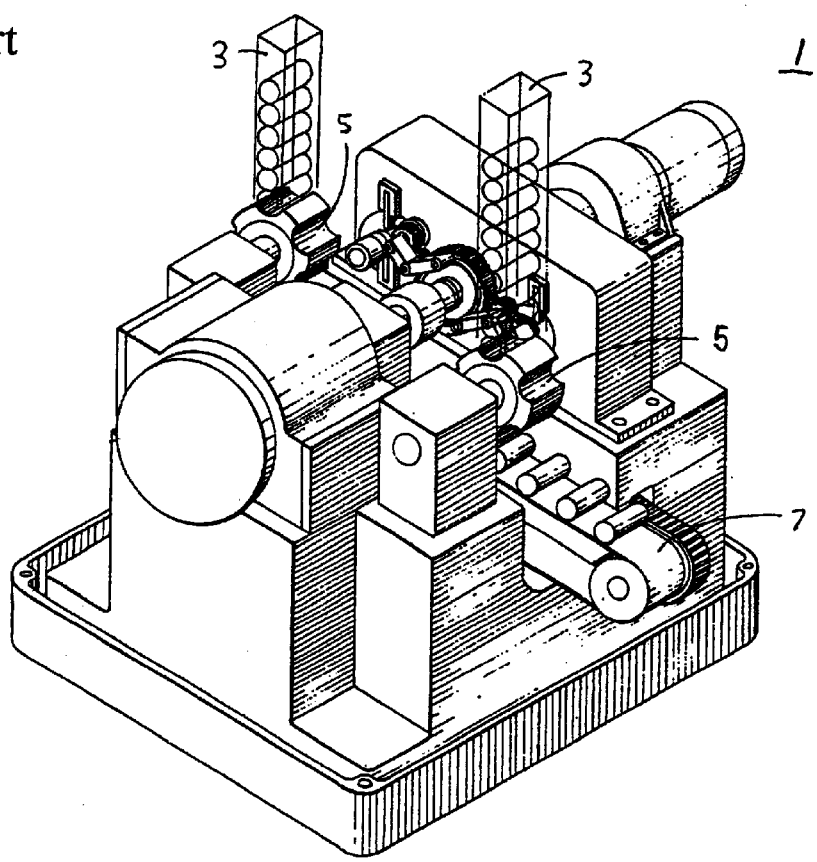
FIG. 1 is a perspective view of a conventional gravity feed.
Figure 2:
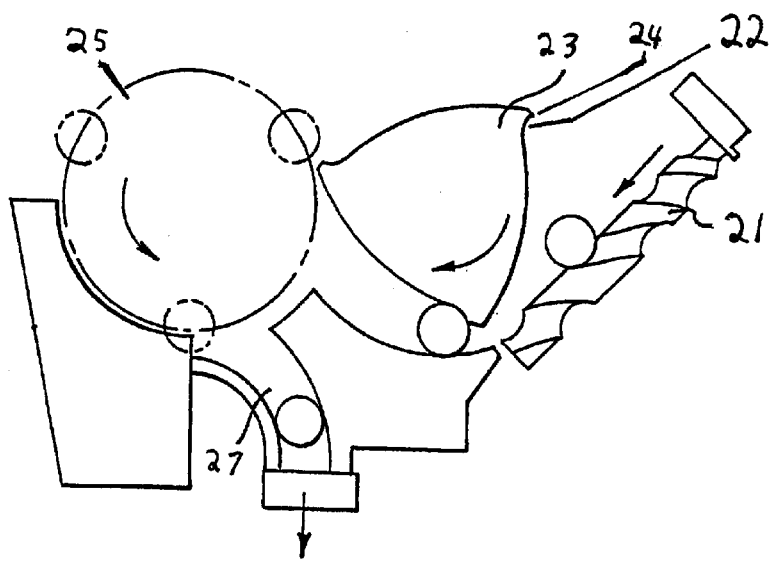
FIG. 2 is a schematic view of a conventional screw feed.
Figure 3:
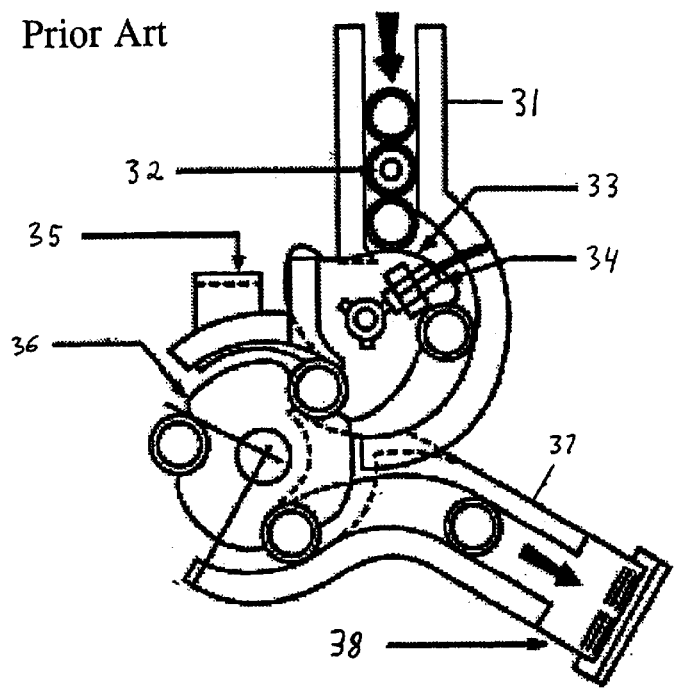
FIG. 3 is a schematic view of a conventional constant velocity mechanism.
Figure 4:
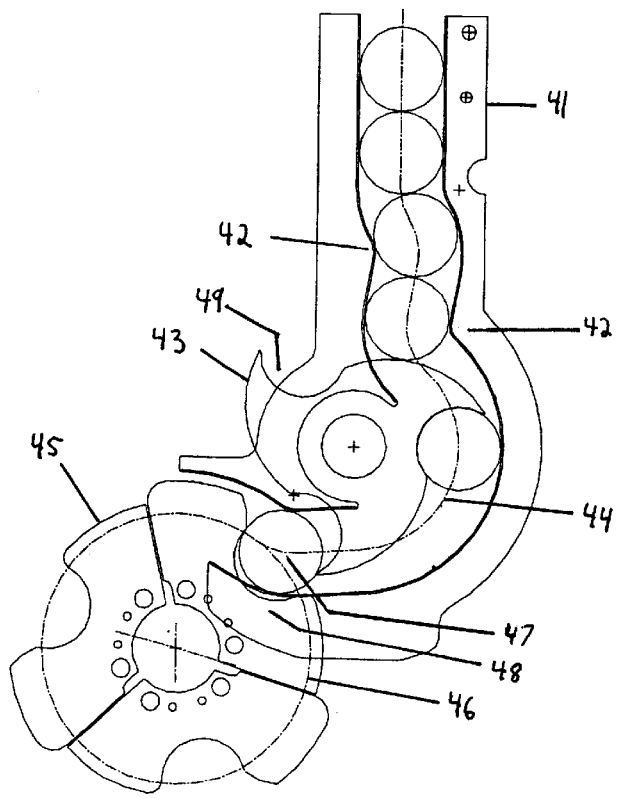
FIG. 4 is a schematic view of one embodiment of the invention.

FIG. 4 illustrates one embodiment of the invention. This embodiment includes an infeed chute 41, an infeed starwheel 43 disposed at one end of the infeed chute 41, and a main turret 45. The infeed starwheel 43, in a preferred embodiment, has three pockets and a first pitch circle 44. The infeed starwheel 43 feeds cans into the main turret 45 which has a second pitch circle 46.

The invention in one embodiment, also includes non-interfacing turret pitches 44, 46. Conventional transfer mechanisms transfer cans "pocket to pocket" at the same diametrical pitch. However, in a preferable embodiment, the pitch can diameter of the infeed starwheel 43 is less than the pitch can diameter of the main turret 45. The smaller initial pitch can diameter 44 substantially reduces the impact energy at the point of separation. In the case of the CC93®, the impact energy is reduced to almost half.

In the first embodiment of the invention, it is not necessary to use gravity, air or another means to energize the can and eject it from the metering pocket against a cooperating surface of the pocket of the subsequent turret. The can is controlled and moved positively by the pockets, starwheel profiles and guides as it is separated and transferred from one pitch circle 44 to the subsequent one 46.

Although the use of non-interfacing pitch circles 44, 46 reduces the impact force compared to the constant velocity starwheel for turret to turret transfers, the profile of the pocket 49 should also be changed. This new profile almost envelopes the can in a hooked pocket, which provide early support of the stack and cleanly knifes the can away and accelerates it into the pocket.

The can is extracted from the pocket 49 and rolled onto the tip of the hook by the guide profiles 48 where it is at the correct, identical pitch diameter for a smooth transfer into the subsequent turret. This gradual, controlled acceleration through the variable pitch line 47 provides the correct pitch line velocity for transfer to the next turret.

A second embodiment of the invention includes the use of humps 42 in the infeed chute 41. Above the humps 42, the infeed chute 41 is conventional. Each hump may be sinusoidal or any other shape that produces a smooth perturbation in the chute. The size of the hump should be large enough to retard the flow of the incoming can so that the speed is compatible with the speed of the infeed starwheel 43. The humps 42 essentially act as a kind of "speed bump", reducing the speed of the can prior to entering the infeed starwheel 43. The hump dissipates the head pressure of the incoming can stack, reducing the scuffmg tendencies of the rapidly moving starwheel periphery 48 on the can body. It also reduces the tendency of the stack pressure to distort the flexible cans and force them past the controlling interacting geometries of the starwheel and guide surfaces. The size of the humps are dependent on the anticipated head pressure. Too large a hump will "choke" the infeed and create miss-feeds at the separation point.

The preferred embodiment of the "Silent Infeed" of the present invention includes both non-interfacing turret pitches 44, 46 and an integrated tight pitch humped section 42 in the throat of the infeed chute. Both are counter to conventional machinery design practice in the art. However, the inventor has determined that both of these features provide benefits to the process and can be used independently. Furthermore, the a invention was illustrated with a three pocket starwheel. However, the invention can be practiced with a starwheel comprising any number of pockets.

Figure 5:
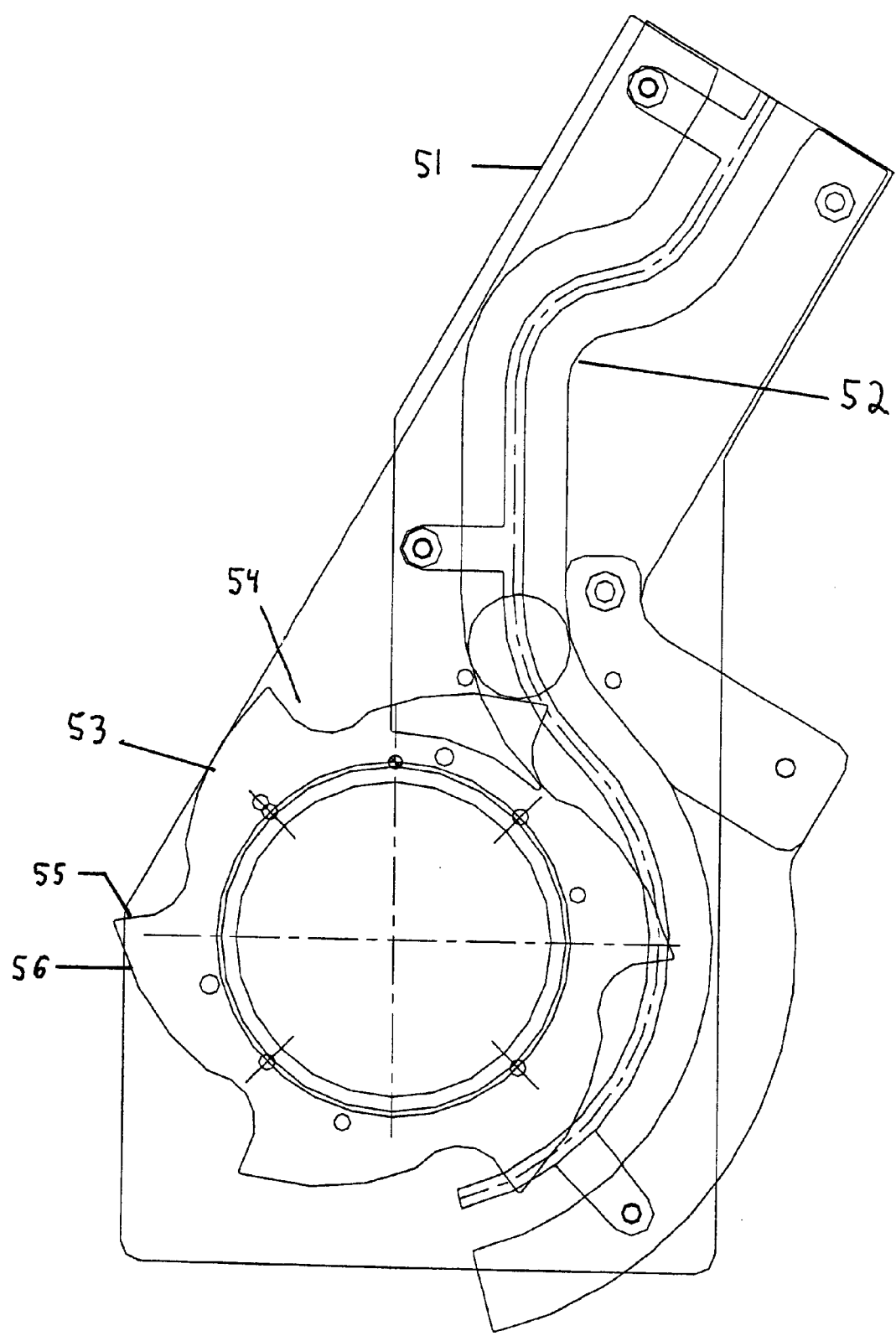
FIG. 5 is a schematic view of a second embodiment of the invention.
Figure 6:
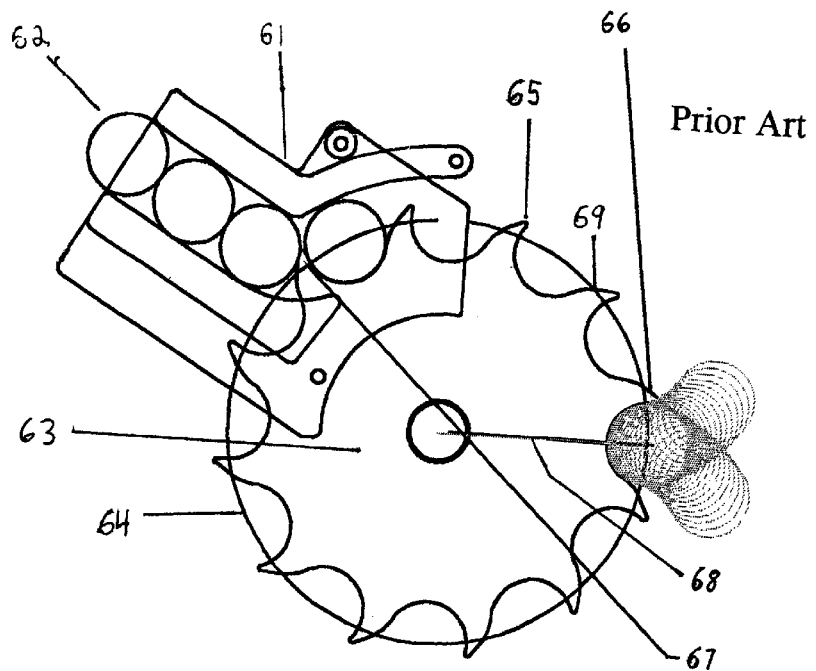
FIG. 6 is a schematic view of a constant velocity starwheel.
Figure 7:
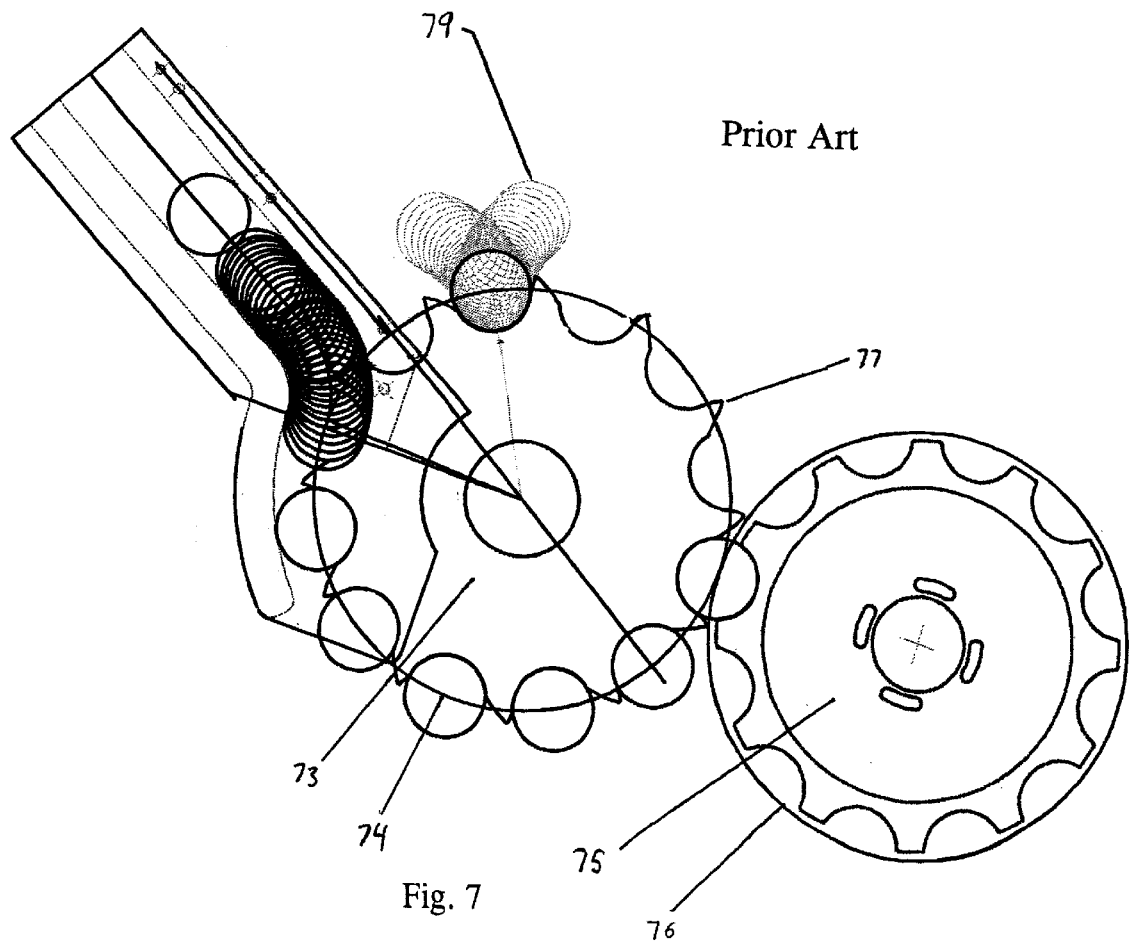
FIG. 7 is a schematic view of a constant velocity starwheel with interfacing pitch circles.

FIG. 5 illustrates another embodiment of the invention. In this embodiment, the hump 52 is more prominent in the infeed chute 51. At the lower end of the infeed chute 51 is a six pocket infeed starwheel 53. Each pocket 54 is defined by a leading edge 55 and a cam shaped trailing edge 56. The cam shaped trailing edge aids in developing the proper speed for the transfer to the pocket.

This invention provides for reduced impact feeding while using existing drive shaft centers and existing shaft gearing ratios. As it is self powered, no extra drive methods are needed and there is no problem of disturbance in a wet or dusty enviromnent.

This invention can be applied to most can, bottle, case, munitions or other regular object feed systems. It will work at high speeds. Within each stage it will double separations at speeds of 2400 units per minute and treble separation at 1200 without denting fragile cans. If used for caseless ammunition up to 30 mm caliber, it is expected to provide a beltless and linkless rotary feed at speeds up to 4000 rpm.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the invention and its practical application. It is intended that the scope of the invention be defined by the claims appended hereto, and their equivalents.

We claim:

1. A feed mechanism for feeding containers comprising:
   an infeed starwheel having tips; and
   a main turret starwheel;
   wherein the pitch diameter of the infeed starwheel and the pitch diameter of the main turret starwheel are non-interfacing,
   wherein the infeed starwheel accelerates the container into the main turret starwheel.

2. A feed mechanism according to claim 1, wherein said infeed starwheel has a pitch diameter smaller than the pitch diameter of said main turret starwheel.

3. A feed mechanism according to claim 2, wherein the tips of the infeed starwheel are hooked.

4. A feed mechanism for feeding containers comprising:
   an infeed starwheel having tips; and
   a main turret starwheel;
   wherein the pitch diameter of the infeed starwheel and the pitch diameter of the main turret starwheel are non-interfacing,
   further comprising a feed chute adapted to hold a stack of incoming containers having a head pressure and wherein said feed chute includes at least one hump in said feed chute for dissipating the head pressure of the incoming container stack.

5. A feed mechanism according to claim 4, further comprising a container conveying mechanism selected from the group consisting of rope, belt, chain, air or vacuum.

6. A feed mechanism for feeding containers comprising:
   an infeed starwheel having tips; and
   a main turret starwheel;
   wherein the pitch diameter of the infeed starwheel and the pitch diameter of the main turret starwheel are non-interfacing,
   further comprising a feed chute adapted to hold a stack of incoming containers having a head pressure and wherein said feed chute includes at least one hump in said feed chute for dissipating the head pressure of the incoming container stack; and wherein said infeed starwheel has a pitch diameter smaller than the pitch diameter of said main turret starwheel and the tips of the infeed starwheel are truncated.

7. A feed mechanism for feeding containers comprising:
   an infeed starwheel having tips;
   a main turret starwheel; and
   a feed chute adapted to hold a stack of incoming containers having a head pressure and wherein said feed chute includes at least one hump for dissipating the head pressure of the incoming container stack.

8. The feed mechanism of claim 7, wherein the tips of the infeed starwheel are hooked.

9. A feed mechanism according to claim 7, further comprising a container conveying mechanism selected from the group consisting of rope, belt, chain, air or vacuum.

10. The feed mechanism of claim 7, wherein the hump is large enough to retard the flow of a container so that the speed of the container is compatible with the speed of the infeed starwheel.

11. The feed mechanism of claim 10, wherein the pitch diameter of the infeed starwheel is less than the pitch diameter of the main turret starwheel.

12. A method of feeding cans to a unit operation in a can making process comprising:
    providing a feed chute for feeding said unit operation, said feed chute having a top end and a bottom end, wherein said feed chute has at least one hump proximal to said bottom end and wherein the feed chute is adapted to reduce the speed of the cans prior to exiting the feed chute; and
    disposing a plurality of cans in said feed chute, thereby forming a stack of cans in said feed chute.

13. The method according to claim 12, wherein the position and shape of the hump results in a single can entering the pocket of a starwheel configured to receive cans exiting the feed chute.

14. The method according to claim 12, further comprising conveying the can with a can conveying mechanism selected from the group consisting of gravity, rope, belt, chain, air or vacuum.

* * * * *